2,940,828
PURIFICATION OF SILVER NITRATE SOLUTIONS

Jerome Albert Moede, Rochester, N.Y., assignor to E. I. du Pont de Nemours and Company, Wilmington, Del., a corporation of Delaware No Drawing. Filed Oct. 29, 1957, Ser. No. 693,048

5 Claims. (Cl. 23—102)

This invention relates to the purification of aqueous silver nitrate solutions. More particularly it relates to the removal of contaminating metal ions from aqueous solutions of silver nitrate.

Photographic silver halide emulsions are made by precipating silver halides in an aqueous colloid medium. The aqueous silver nitrate solutions used as the source of the silver ions should be very pure and free from other metal salts in order to obtain optimum photographic properties. The prior art methods for the preparation of such solutions are quite time-consuming and tedious and require a plurality of crystallizations.

In U.S. Patent 2,543,792 which issued Mar. 6, 1951, and U.S. Patent 2,614,029 which issued Oct. 14, 1952, processes of purifying aqueous silver nitrate solutions are described which are superior to the tedious and time-consuming methods of obtaining pure silver nitrate by repeated crystallization. However these processes while commercially practical have some disadvantages. Thus the process of U.S. Patent 2,543,792 has the disadvantage that the alumina used must be replaced or regenerated frequently because it is exhausted rapidly by the acid nature of the silver nitrate solution, and the relatively large quantities of metal impurities which must be removed. While the process of U.S. Patent 2,614,029 overcomes this disadvantage, both of the processes involve treatment of the solutions with activated carbon. This material is dusty and may introduce difficulties in handling because of its light powdery nature.

An object of this invention is to provide an improved process for preparing silver nitrate solutions having a high degree of purity. Another object is to provide a simplified process for preparing silver nitrate solutions of good photographic quality. A further object is to provide a process which is free from the disadvantages of the processes described in the aforesaid patents. A still further object is to provide such a process which is economical and can be carried out on a relatively large scale. Still other objects will be apparent from the following description of the invention.

The above objects are accomplished and the disadvantages of prior art silver nitrate purification procedures overcome by the process of this invention which comprises; (a) treating an aqueous solution of silver nitrate which contains other metals and metal ions as impurities, e.g., copper, iron, lead, gold, bismuth, mercury, the "platinum metals," etc., with sufficient silver oxide to attain a pH of at least 6.1 and preferably between 6.1 and 9.0 (the pH attained with a given amount of silver oxide will vary with the concentration of the silver nitrate solution), (b) exposing the aqueous silver nitrate solution to ultraviolet light, (c) filtering the solution, and (d) passing it into contact with at least one water-insoluble, porous, solid basic adsorbent, e.g., activated alumina or magnesia.

In the event the solution recovered is still cloudy or hazy because of the presence of alumina or magnesia particles the solution can be passed through a microporous filter, e.g., a stainless steel microporous material or an inert microporous clay ceramic material or fritted glass.

Step "a" can be advantageously carried out by adding silver oxide to a 3 to 9 molar aqueous solution of silver nitrate which contains other heavy metal salts as impurities until the pH of the solution has been raised above 6:1. The amount of silver oxide used will depend on the pH of the untreated solution which generally is between 0.5 and 3.6. The precipitate formed and any excess silver oxide are after ultraviolet treatment filtered off and the resulting silver nitrate solution removed and subjected to further treatment. It has been determined that this step removes by precipitation as the hydroxides or free metals practically all of the metal impurities which behave as poisons in photographic emulsions and which are normally present in nitric acid and silver bullion.

The treatment of the material with ultraviolet light following step (a) removes ions of metals of the "platinum" group, gold, bismuth and mercury and photographically harmful organic impurities remaining in the supernatant solution after the treatment with silver oxide.

The aqueous silver nitrate solution which is recovered after the ultraviolet light treatment can then be brought into intimate contact with particles or pieces of activated alumina or magnesia preferably by passing it through a column packed with same. In general, there should be from 2 to 10% by weight of activated alumina based on the amount of silver nitrate in the original solution. The activated alumina or magnesia are also preferably in fine granular form having an average particle size of 28–100 mesh. It has been determined that this step removes substantially all of the metal ion impurities which remain in the solution. Treatment of the alumina to coat it with silver oxide and the use of silver oxide coated glass filters as shown in U.S. Patent 2,614,029 can also be used.

The aqueous silver nitrate solution recovered from the activated alumina may sometimes contain fine particles of alumina in suspension and they can be removed by any practical method of removing fine particles from solution so that they will not cause spots in the finished films or papers. The removal of the particles can be advantageously accomplished by filtering the solution through a stainless steel filter having an average pore size of 5 microns or less.

After any alumina or magnesia particles have been removed, the pH of the silver nitrate solution can be adjusted to 3.0–3.5 with dilute nitric acid and the solution is then of such high degree of purity that it can be used directly for the precipitation of light-sensitive silver halides in a photographic colloid emulsion.

In carrying out the process of the present invention considerable flexibility of operation is possible. The silver used can be relatively impure including commercial silver bullion in bar, pellet or crystal form and the nitric acids can be C.P., technical or commercial grade. The silver oxide used in the process can be the dry pulverized form or used in the form of a freshly prepared paste or slurry as described in Example V of U.S. 2,614,029, the latter form being preferred.

The ultraviolet light treatment can be carried out using a wide variety of equipment and light sources. Suitable light sources include carbon arcs, mercury vapor arcs, fluorescent lamps with special ultraviolet light emitting phosphors, argon glow lamps and photographic flood lamps. Of these the mercury vapor arcs, e.g., commercial type sun-lamps are preferred. The ultraviolet lamps can be used singly or in groups and the equipment arranged in any convenient manner to irradiate the solutions being treated. The time of irradiation can be adjusted over a wide range from 15 minutes or less to 5 hours or more depending upon the purity of the silver nitrate to be treated, the concentration of the solution and the depth of solution exposed to the ultraviolet light. The quantity of ultraviolet radiation can range from about 100 to 1750 microwatt-hours of ultraviolet radiation per gram of silver nitrate treated. While treatment in stirred vessels is shown in the examples, it will be understood within the scope of this invention that silver nitrate solutions can be treated continuously in thin films flowing past a bank of ultraviolet radiation emitting lamps or in transparent pipes of quartz or ultraviolet radiation transmitting glass or plastics. Ultraviolet radiation having a wavelength within the range of about 1850 to about 3800 angstroms is suitable. While a broad range of ultraviolet radiation can be used in the process, light sources providing a high proportion of illumination around wavelength 2537 A. are especially useful.

Fresh aluminum oxide or magnesium oxide can be used when the adsorptive capacity begins to diminish but regeneration of the adsorbents is economical and has other advantages. Alumina can be regenerated in the adsorption column by washing first with concentrated nitric acid, e.g., 33–70%, followed by dilute nitric acid, e.g., 0.5 to 1%, and then by distilled water, after which the column is washed with sodium hydroxide (about 0.25 to 3 molar) and again with distilled water. It is preferable that the acid and base used in washing the column be of C.P. grade. The quantities and rates of flow can be adjusted by simple tests on the washings to determine the pH, conductivity and/or chemical content.

The invention will be further illustrated but it is not intended to be limited by the following examples:

EXAMPLE I

A solution of silver nitrate was prepared from 99.9 silver bullion by dissolving it in 59% commercial grade nitric acid using 100 parts by weight bullion to about 152 parts by weight of nitric acid. The acid was added in portions to the silver bullion to maintain the temperature in the range of 71° to 82° C. The temperature in the reaction vessel was maintained constant for about 15 minutes, and then raised to the boiling point and boiled until the resulting solution attained a pH of about 0.5. Undissolved silver was then filtered off and the solution boiled for another sixty minutes after which the solution was diluted with distilled water to 6N.

Twenty-four to twenty-five gallons of the silver nitrate solution described above in a 35 gallon kettle furnished with a stirrer was treated as described in U.S. Patent 2,614,029 by the addition of silver oxide until the pH increased to a value above 6.1. Stirring was continued and the solution irradiated by radiation from a General Electric RS sunlamp placed about one foot from the surface of the solution for a period of 2 hours. The solution depth in the kettle was about 3 feet. The General Electric RS sunlamp is described in General Electric Company Lamp Bulletin LD-1 as a mercury vapor lamp having a 100 watt mercury discharge element and a 175 watt tungsten filament ballast in a frosted glass envelope. This lamp is operated on 60 cycle 110 volt alternating current and requires 3 minutes to reach full ultraviolet output of about 35,000 E-vitons.

The solution was filtered and pumped through one part of activated alumina, 28–48 mesh, for 15.8 parts of solid silver nitrate in the solution, the alumina being packed over a pad of glass wool in a column having a ratio of height to width of 4 to 1. The solution was then filtered into a stainless steel receiving kettle. After purification the pH was adjusted to 3.0 with 1 N nitric acid and crystals of silver nitrate of high purity were prepared from the solution by evaporation and crystallization.

Data from the spectrographic analysis of the silver nitrate crystals obtained by the above process are summarized below:

*Metal impurity grams per $10^6$ grams silver nitrate*

| Pd | Au | Cu | Pb | Bi |
|---|---|---|---|---|
| less than 0.05 | less than 0.25 | less than 5.0 | less than 1.5 | less than 0.0025 |

| Pt | Hg | Ir | Ru | Rh | Na |
|---|---|---|---|---|---|
| less than 0.50 | less than 0.15 | less than 0.02 | less than 0.15 | less than 0.02 | less than 60.0 |

The silver nitrate prepared by the above procedure was used to prepare a positive type gelatino silver iodobromide emulsion having 1 mole percent iodide and the rest bromide and compared to a control emulsion prepared by the same procedure using a C.P. grade of silver nitrate commonly used in the manufacture of photographic emulsions and manufactured by the conventional method of repeated crystallization.

The films tested were exposed in a sensitometer and developed at 68° F. for 3.5 minutes in a developer consisting of 0.46 gm. N-methyl-p-aminophenol sulfate, 3.4 gms. hydroquinone, 28 gms. sodium sulfite, 10 gms. of the mono-hydrate of sodium carbonate, and 0.44 gm. of potassium bromide, all diluted up to one liter, and fixed, washed and dried in a conventional manner.

The speed, H and D gamma and fog values for the two emulsions were closely similar to each other as shown below.

| Aged at 80° F. and 60% RH Time (month) | Test Emulsion | | | Control Emulsion | | |
|---|---|---|---|---|---|---|
| | Rel. Speed | H and D Gamma | Fog | Rel. Speed | H and D Gamma | Fog |
| 9 | 97 | 2.62 | 0.03 | 100 | 2.54 | 0.02 |

Results of tests on the silver nitrate in a high speed negative type gelatino silver iodobromide emulsion having 3.4% iodide compared with C.P. grade silver nitrate in an emulsion made in an identical manner are shown below.

The films tested were developed at 68° F. for 3.5 minutes in a developer consisting of 2.5 gms. N-methyl-p-aminophenol sulfate, 2.5 gms. hydroquinone, 50 gms. sodium sulfite, 24.8 gms. of the mono-hydrate of sodium carbonate, 14.0 gms. borax and 0.50 gm. of potassium bromide, all diluted up to 1 liter, and fixed, washed and dried in a conventional manner.

| | Test Emulsion | | | Control Emulsion | | |
|---|---|---|---|---|---|---|
| | Rel. Speed | H and D Gamma | Fog | Rel. Speed | H and D Gamma | Fog |
| Fresh | 123 | 1.10 | .04 | 132 | 1.10 | .04 |
| 7 days at 65% RH at 120° F | 115 | .93 | .04 | 107 | .95 | .03 |

EXAMPLE II

There was prepared 2.65 liters of 8.8 N silver nitrate solution using C.P. grade nitric acid and a mixture of silver bars and crystals ranging in purity from 99.9% to 99.97%. A 1425 ml. portion of this solution was adjusted to a pH above 6.0 by slowly adding freshly precipitated and washed silver oxide with constant stirring. The mixture was diluted with 250 ml. of water and then exposed for 90 minutes to the radiation from a Hanovia quartz mercury vapor lamp which, when operated on 60 cycle 115 volt current, draws approximately 100 watts and provides an illumination at 20 inches of above 250 microwatts measured at wavelengths of 3130 A. and lower. The lamp was positioned close to the surface of the solution in a two liter beaker and the solution stirred during exposure. The solution was then filtered through glass wool and a medium porosity glass disc and the filter washed with small portions of distilled water. All but 250 ml. of the solution which was removed for analytical purposes was passed through a column containing 75 grams of aluminum oxide adsorbent and the pH adjusted to 2.9. Data from the spectrographic analysis of the silver nitrate solution obtained by the above process is summarized below:

*Metal impurity grams per $10^6$ grams silver nitrate*

| Pd | Au | Cu | Pb | Bi |
|---|---|---|---|---|
| less than 0.15 | less than 0.5 | less than 5.0 | less than 1.5 | less than 0.01 |

| Pt | Hg | Ir | Ru | Rh | Na |
|---|---|---|---|---|---|
| less than 1.0 | less than 0.3 | less than .02 | less than .03 | less than 0.04 | less than 60 |

The silver nitrate prepared by the above procedure was used to prepare an X-ray type gelatino silver iodobromide photographic emulsion having 1.55 mole percent iodide and the rest bromide, and compared with a control emulsion prepared by the same procedure using a C.P. grade of silver nitrate commonly used in the manufacture of photographic emulsion and manufactured by the conventional method of repeated crystallization. The films tested were developed at 68° F. for five minutes in a developer consisting of 5.0 gms. N-methyl-p-aminophenol sulfate, 7.5 gms. hydroquinone, 60.0 gms. sodium sulfite, 58.5 gms. of the mono-hydrate of sodium carbonate, and 4.5 gms. of potassium bromide, all diluted up to one liter, and fixed, washed and dried in a conventional manner:

|  | Test Emulsion ||| Control Emulsion |||
|---|---|---|---|---|---|---|
|  | Rel. Speed | H and D Gamma | Fog | Rel. Speed | H and D Gamma | Fog |
| Fresh | 174 | 2.99 | .02 | 152 | 2.57 | .02 |
| 7 days at 65% RH at 120° F | 132 | 2.18 | .06 | 100 | 2.16 | .04 |

This invention has the advantage that it provides a practical process for purifying aqueous silver nitrate solutions on a commercial scale. A further advantage resides in the fact that the first step alone of adding sufficient silver oxide to attain a pH of at least 6.1 removes more than 90% of the metal impurities present in silver nitrate obtained from silver bullion and commercial nitric acid. The use of silved oxide before treatment with alumina has the advantage that the alumina does not have to be replenished or regenerated as frequently and a smaller amount of this material can be used. The ultraviolet radiation exposure is used in place of the carbon black treatment of U.S. 2,614,029. The ultraviolet treatment is advantageous because it eliminates the dust, difficulties in handling because of its light powdery nature, and cost of the carbon adsorbent. Yet another advantage resides in the fact that more uniform purified silver nitrate solutions can be made from different lots of solutions treated.

As many widely different embodiments of this invention can be made without departing from the spirit and scope thereof, it is to be understood that the invention is not to be limited except as defined by the claims.

What is claimed is:

1. A process of purifying an aqueous solution of silver nitrate containing small amounts of heavy metal and noble metal impurities which consists of treating said solution with silver oxide to attain a pH of at least 6.1, exposing said solution to ultraviolet radiation having a wavelength within the range of about 1850 to about 3800 angstroms in an amount of from about 100 to about 1750 microwatt hours of ultraviolet radiation per gram of silver nitrate treated, separating the silver nitrate solution from the precipitate, and passing the resulting solution into contact with at least one water-insoluble porous solid adsorbent taken from the group consisting of alumina and magnesia.

2. A process of purifying an aqueous solution of silver nitrate containing small amounts of heavy metal and noble metal impurities which consists of treating said solution with silver oxide to attain a pH of at least 6.1, treating said solution with ultraviolet radiation having a wavelength within the range of about 1850 to about 3800 angstroms in an amount of from about 100 to about 1750 microwatt hours of ultraviolet radiation per gram of silver nitrate treated, separating the silver nitrate solution from the precipitated metals and metal hydroxides and silver oxide, and passing the resulting solution into contact with alumina.

3. A process of purifying an aqueous solution of silver nitrate containing small amounts of heavy metal and noble metal impurities which consists of treating said solution with silver oxide to attain a pH between 6.1 and 9.0, exposing said solution to ultraviolet radiation having a wavelength within the range of about 1850 to about 3800 angstroms in an amount of from about 100 to about 1750 microwatt hours of ultraviolet radiation per gram of silver nitrate treated, allowing the precipitated metals, metal hydroxides and silver oxide to separate out, removing the silver nitrate solution, and bringing the resulting solution into intimate contact with particles of adsorbent material taken from the group consisting of alumina and magnesia.

4. A process for purifying an aqueous solution of silver nitrate containing small amounts of heavy metal and noble metal impurities which consists of treating said solution with silver oxide to attain a pH of 6.1 to 9.0, exposing said solution to ultraviolet radiation having a wavelength within the range of about 1850 to about 3800 angstroms in an amount of from about 100 to about 1750 microwatt hours of ultraviolet radiation per gram of silver nitrate treated, allowing the precipitated metals, metal hydroxides and any silver oxide to separate out, removing the silver nitrate solution, bringing said solution into contact with activated alumina, and additionally filtering said solution.

5. A process of purifying an aqueous solution of silver nitrate containing small amounts of heavy metal and noble metal impurities which consists of treating said solution with silver oxide to obtain a pH of from 6.1 to 9.0, exposing said solution to ultraviolet radiation having a high proportion of illumination at about 2537 A. wavelength in an amount of from about 100 to about 1750 microwatt hours of ultraviolet radiation per gram of silver nitrate treated, allowing the precipitated metals, metal hydroxides and any silver oxide to separate out, removing the silver nitrate solution, and bringing the resulting solution into contact with from 2 to 10% by weight based on the silver nitrate of finely divided activated alumina having an average particle size of 28–100 mesh.

References Cited in the file of this patent

UNITED STATES PATENTS

| 873,508 | Cowper-Bowles | Dec. 10, 1907 |
| 2,207,566 | Waldeck | July 9, 1940 |
| 2,282,294 | Coey | May 5, 1942 |
| 2,614,029 | Moede | Oct. 14, 1952 |

FOREIGN PATENTS

| 17,790 of 1913 | Great Britain | July 20, 1914 |

OTHER REFERENCES

Hackh's Chemical Dictionary, 3rd ed., 1944, Blakiston, pp. 878–79.